United States Patent [19]

Demos et al.

[11] 3,835,396

[45] Sept. 10, 1974

[54] DEVICE FOR CHANGING FREQUENCY OF CONSTANT AMPLITUDE SQUARE WAVES

[76] Inventors: Gary A. Demos, 1153 Descanso Dr., Los Angeles, Calif. 91011; David S. Ruhoff, P.O. Box 4492, Los Angeles, Calif. 91106

[22] Filed: Sept. 12, 1973

[21] Appl. No.: 396,372

[52] U.S. Cl. ........................ 328/41, 328/38, 328/15
[51] Int. Cl. ........................................ H03k 21/06
[58] Field of Search .................... 328/15, 25, 38, 39

[56] References Cited

UNITED STATES PATENTS

| | | | |
|---|---|---|---|
| 3,263,174 | 7/1966 | Bjorkman et al. | 328/25 |
| 3,353,104 | 11/1967 | Loposer | 328/39 |
| 3,581,116 | 5/1971 | Leostic | 328/41 X |
| 3,619,669 | 11/1971 | Wheeler | 328/41 X |
| 3,657,658 | 4/1972 | Kubo | 328/39 X |
| 3,671,871 | 6/1972 | Malm | 328/25 |
| 3,753,125 | 8/1973 | Ishikawa | 328/38 |

*Primary Examiner*—John S. Heyman
*Attorney, Agent, or Firm*—Clarence A. O'Brien; Harvey B. Jacobson

[57] ABSTRACT

An input signal having a constant amplitude, square wave form shape, is reproduced with the same square wave form and amplitude but at a frequency that is equal to the input frequency multiplied and divided by two factors externally programmed into a logic section within which a fixed frequency clock signal is compared with the input frequency. The clock signal divided by one of the externally programmed factors drives an input counter until reset by the input signal to produce a number loaded into an output counter in a down counting operational mode to produce an output signal which is divided by the other externally programmed factor either before or after counting of the clock signal.

15 Claims, 4 Drawing Figures

DEVICE FOR CHANGING FREQUENCY OF CONSTANT AMPLITUDE SQUARE WAVES

This invention relates generally to the processing of signals and more particularly to the selectively controlled change in frequency of digital pulse signals.

In the alignment, testing, synchronizing and calibrating of electronic equipment, a device for selectively changing the frequency of an input signal without disturbing its wave form and amplitude, is a very useful tool. While frequency changing devices are generally well known, one which is relatively inexpensive yet extremely effective in preserving wave form shape and amplitude, particularly for digital pulse signals, has not been available. It is therefore an important object of the present invention to provide such a frequency changing device capable of being externally programmed for changing the frequency of an input signal in accordance with at least two selected factors.

The use of digital logic counters to effect frequency division of a signal by a programmable factor, is well known. However, the use of correspondingly simple digital logic components to effect true frequency multiplication is not generally known and represents another object of the present invention.

In accordance with the present invention clock signals from a high speed clock drive input and output counters. The frequency of the clock signals fed to the input counter is reduced by a pulse divider at one externally programmed rate. The input counter, reset by the input signal, produces a digital number representing the ratio in time of the input signal pulses to the divided clock pulses. This digital number is loaded into the output counter by a latch and is counted down to zero producing a carry output signal from the output counter. The output counter is either directly clocked from the source of clock signals in which event the output signals are divided by another externally programmed factor, or the clock signal is divided by this factor before it is fed to the output counter. The carry output of the output counter is passed through a flip-flop to restore the square wave shape of the input signal. To cancel the frequency dividing affect of this flip-flop, a compensating flip-flop is inserted between the clock and the input terminal of the input counter These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
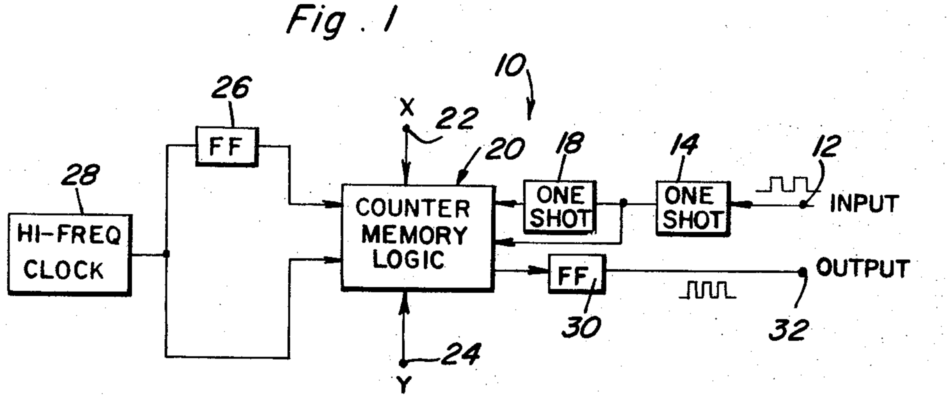
FIG. 1 is a schematic block diagram showing the basic system of the present invention.

The basic system 10 diagrammed in FIG. 1 shows a square wave input signal fed from the input terminal 12 to a one-shot multivibrator 14. The output signal is passed by the one-shot multivibrator 14 directly to a logic section 20 momentarily preceding an input pulse passed by a second one-shot multivibrator 18 to the logic section for cycle reset purposes. Factors (X) and (Y) are externally programmed into the logic section 20 at 22 and 24 in order to divide the frequency of a clock signal of fixed frequency derived from a high frequency clock 28. The clock signal pulses are fed along two paths to be respectively divided by the (X) and (Y) factors in the logic section producing output pulses at a frequency (fo) in accordance with the formula:

$fo = fi\ (X/Y)$, where $fi$ is the input frequency.

To restore the square wave shape and amplitude of the input signal, the output of the logic section 20 is passed through a flip-flop 30 to the output terminal 32. The frequency dividing affect (divide by two) of the flip-flop 30 on the signal is cancelled by inserting a compensating flip-flop 26 in one of the paths through which clock pulses are fed to the logic section for division by the factor (X).

Figure 2:
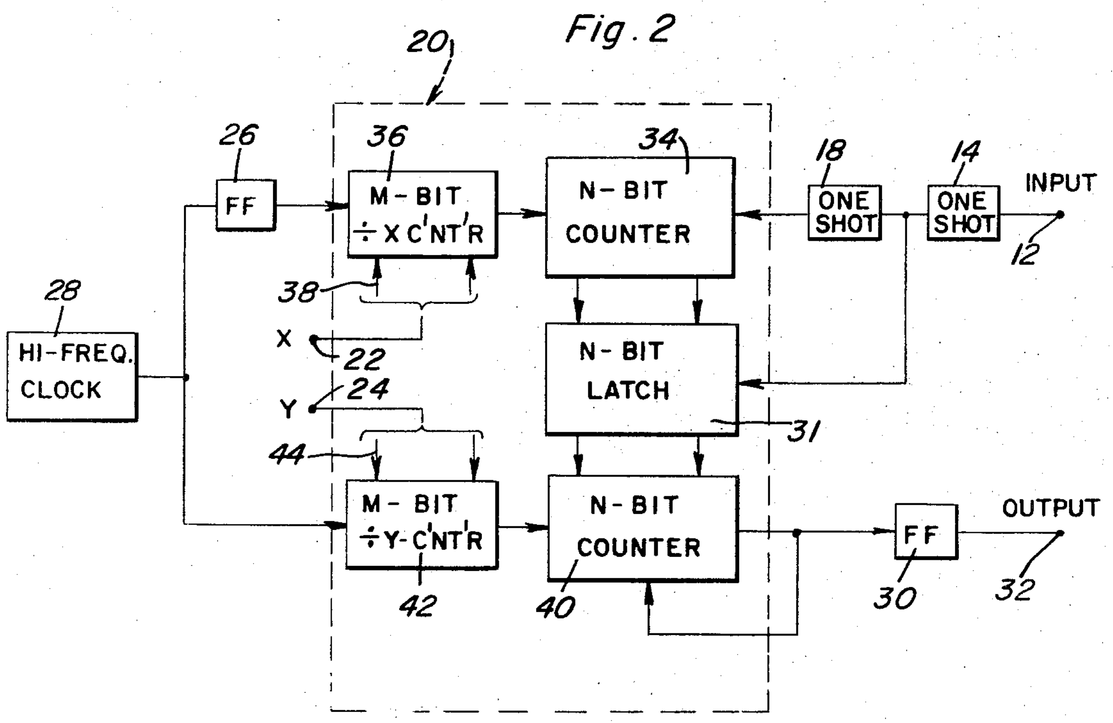
FIG. 2 is a more detailed block circuit diagram of one embodiment of the system.

As shown in FIG. 2, a square wave at the input terminal 12 drives the one-shot multivibrator 14 producing a pulse at the leading edges of the square input pulses. The output pulses of the one-shot multivibrator 14 are applied directly to the load terminal of a multi-bit latch 31 of the logic 20 as well as to drive the second one-shot multivibrator 18 through which a counter 34 is reset. The counter 34 up counts clock pulses derived from the high frequency clock 28. The output of the clock 28 is passed through the flip-flop 26 to divide its pulses in two before the clock pulses are further divided by a multi-bit divider counter 36 and fed to the counter 34.

The digital number (X) is externally applied at terminals 38 to the divider counter 36 so as to divide the clock pulse frequency by a factor (X) before the divided clock pulses are counted by the counter 34. A number representing the ratio of the time between the input pulses from input terminal 12 to the frequency divided clock pulses applied to the clock input terminal of counter 34, is loaded into the latch 31 in view of the input pulse fed to the latch from one-shot multivibrator 14 just before the second one-shot multivibrator 18 applies the input pulse to the reset terminal of the counter 34.

Whereas the counter 34 counts up at a speed determined by the (X) input to the divider counter 36, an output counter 40 counts down clock pulses from the number fed by the complementary data out terminals of the latch 31 to the output counter, this down counting being accomplished by connecting the carry out terminal of counter 40 to its load data in terminal. The frequency of the clock pulses fed to the counter 40 is divided by a factor (Y) and toward that end, the clock pulses from clock 28 are passed through a divider counter 42 to which the digital number (Y) is externally applied through terminals 44.

Figure 3:
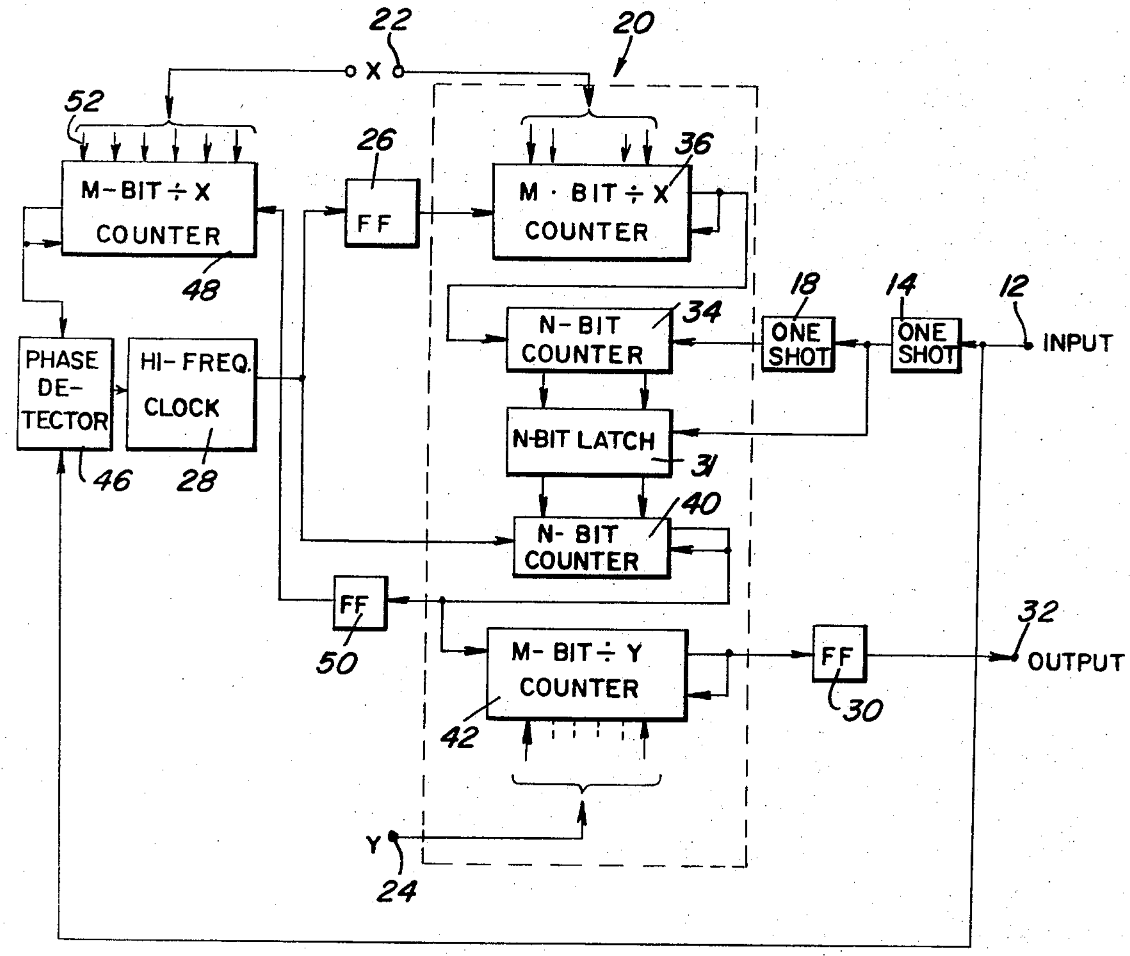
FIG. 3 is a block diagram showing another embodiment of the system.
Figure 4:
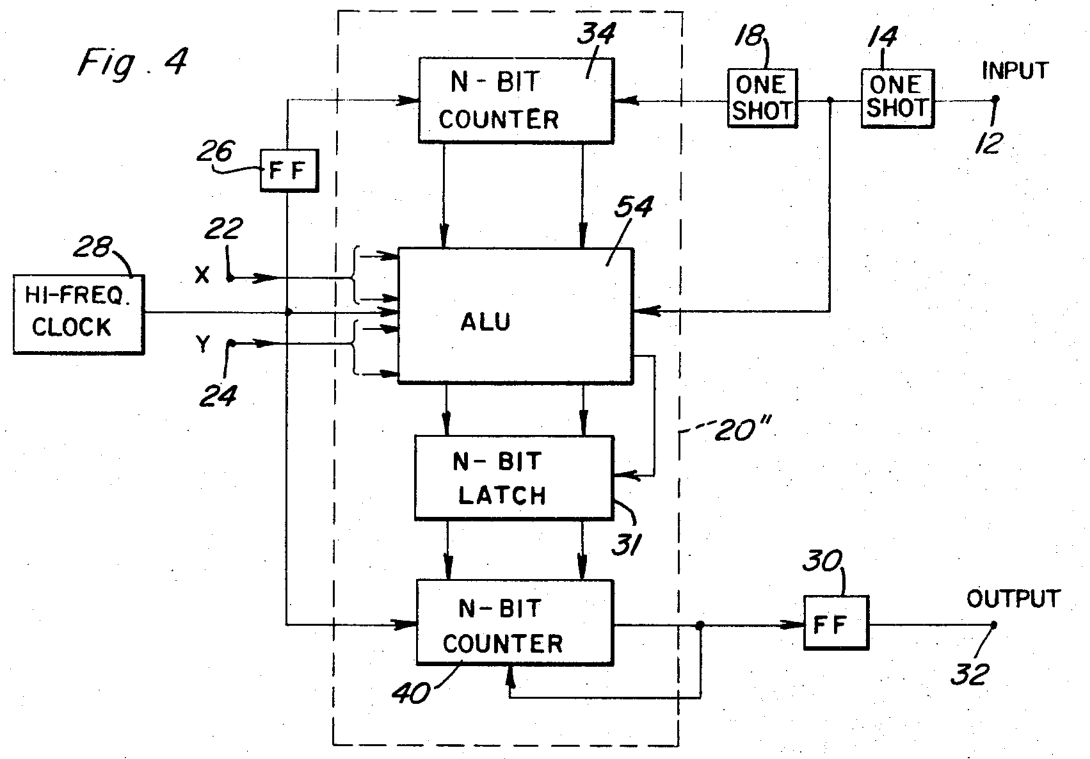
FIG. 4 is a block diagram showing yet another embodiment.

In FIG. 3, the system as described with respect to FIG. 2 has been modified by revision of the logic section 20 to increase stability and the addition of a phase detector 46 and a second input divider counter 48 in order to widen the frequency operating range.

In the modified logic section 20', the output counter 40 is directly clocked from the clock 28 while the divider counter 42 that is externally programmed by the (Y) factor, directly divides the frequency of the output of counter 40.

The phase detector 46 and divider counter 48 are arranged to form a phase lock loop configuration. This effectively eliminates the jitter problem. Accordingly, the input terminal 12 is connected to the phase detector in order to control the clock 28. The output of counter 40 is passed through a flip-flop 50 to compensate for the frequency multiplying affect of flip-flop 26, before it is fed to the input of the divider counter 48 which is externally programmed by the (X) factor simultaneously with divider counter 36, through terminals 52. The output of divider counter 48 is applied to the other input termial of the phase detector 46. The foregoing arrangement will allow the system to operate as intended despite selective change of frequency in fractional relationships. A system of this type is therefore most versatile and useful for music, video, motor and computer peripheral synchronization, and error signal analysis, as well as for wide range applications.

Where great accuracy is necessary, the basic system as depicted in FIG. 2, is modified with respect to the logic section 20. As shown in FIG. 2, the logic section 20'' has its output counter 40 directly clocked from the clock 28 while the externally programmed inputs at 22 and 24 are applied to an arithmetic logic unit (ALU) together with the clock pulses from clock 28. The unit 54 is interposed between the outputs of input counter 34 and the data input and output terminals of the latch 31. The input pulses from one-shot multivibrator 14 are also applied to the trigger input terminal of unit 54.

The arithmetic logic unit is of a type that functions to sequentially multiply and divide at input frequencies up to 10 kHz for currently available components, in an operation sequence initiated by each trigger pulse applied. This sequence consists of: (1) loading a number from counter 34, (2) multiplying the number by (Y), (3) dividing the number by (X), (4) comparing the result with the number in latch 31, (5) loading the result into the latch if any difference is greater than one, and (6) waiting for the next trigger pulse. The foregoing sequence will insure that the output signal will be stable even though the last bit of the input counter 34 fluctuates when the clock frequency is not a harmonic of the input frequency.

The foregoing embodiments of the invention may be constructed from high speed logic components to obtain clock frequencies as high as 500 MHZ, and can be used to direct fractional multiplication on signals in video, radio and radar equipment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A device for changing the frequency of an input signal, comprising input and output pulse counters, a source of clock signals of fixed frequency, means for transmitting said clock signals to said counters for drive thereof, logic means connected to said counters for loading the output counter with a number derived from the input counter, externally programmed means connected to said logic means for dividing the frequency of the clock signals driving the input counter, input signal transmitting means connected to the input counter and the logic means for cyclically generating the number loaded into the output counter as a function of the ratio of the frequency of the clock signal driving the input counter to the frequency of the input signal output means connected to the output counter for producing an output signal in response to down count of said number loaded into the output counter.

2. The combination of claim 1 including means connected to the output means for restoring the wave shape of the input signal to the output signal, and compensating means connected to the source of clock signal for cancelling the frequency dividing affect of the wave shape restoring means on the output signal.

3. The combination of claim 2 wherein said input signal transmitting means comprises a first one-shot multivibrator supplying input signal pulses to the logic means, and a second one-shot multivibrator connected in series between the first one-shot multivibrator and the input counter for supplying reset pulses to the input counter.

4. The combination of claim 3 wherein said logic means includes an electronic latch having a plurality of data outputs connected to the output counter and a pulse divider connecting the externally programmed means to the input counter for dividing the clock signals fed thereto by an (X) factor.

5. The combination of claim 4 wherein said logic means further includes a second pulse divider connecting the externally programmed means to the output counter for dividing the clock signals fed thereto by (Y) factor.

6. The combination of claim 3 wherein said logic means includes an electronic latch having a plurality of data outputs connected to the output counter, and an arithmetic logic connecting the input counter to the latch and having a trigger input connected to the input signal transmitting means, said externally programmed means being connected to the arithmetic logic unit for sequentially multiplying and dividing the number derived from the input counter by different factors, respectively.

7. The combination of claim 4 wherein said logic means further includes a second pulse divider connecting the externally programmed means to the output counter for dividing the output signal by a (Y) factor.

8. The combination of claim 7 including phase locking loop means interconnected between the input signal transmitting means and the second divider to which the externally programmed means is connected.

9. The combination of claim 1 wherein said input signal transmitting means comprises a first one-shot multivibrator supplying input signal pulses to the logic means, and a second one-shot multivibrator connected in series between the first one-shot multivibrator and the input counter for supplying reset pulses to the input counter.

10. The combination of claim 1 wherein said logic means includes an electronic latch having a plurality of data outputs connected to the output counter and a pulse divider connecting the externally programmed means to the input counter for dividing the clock signals fed thereto by an (X) factor.

11. The combination of claim 10 wherein said logic means further includes a second pulse divider connecting the externally programmed means to the output counter for dividing the clock signals fed thereto by a (Y) factor.

12. The combination of claim 10 wherein said logic means further includes a second pulse divider connecting the externally programmed means to the output counter for dividing the output signal by a (Y) factor.

13. The combination of claim 12 including phase locking loop means interconnected between the input signal transmitting means and the second divider to which the externally programmed means is connected.

14. The combination of claim 10 wherein said logic means includes an electronic latch having a plurality of data output connected to the output counter, and an arithmetic logic unit connecting the input counter to the latch and having a trigger input connected to the input signal transmitting means, said externally programmed means being connected to the arithmetic logic unit for sequentially multiplying and dividing the number derived from the input counter by different factors, respectively.

15. The combination of claim 2 wherein said logic means includes an electronic latch having a plurality of data output connected to the output counter and a pulse divider connecting the externally programmed means to the input counter for dividing the clock signals fed thereto by an (X) factor.

* * * * *